Jan. 14, 1930.  W. J. NOLAN  1,743,616
CAMERA
Filed Feb. 7, 1927  6 Sheets-Sheet 1
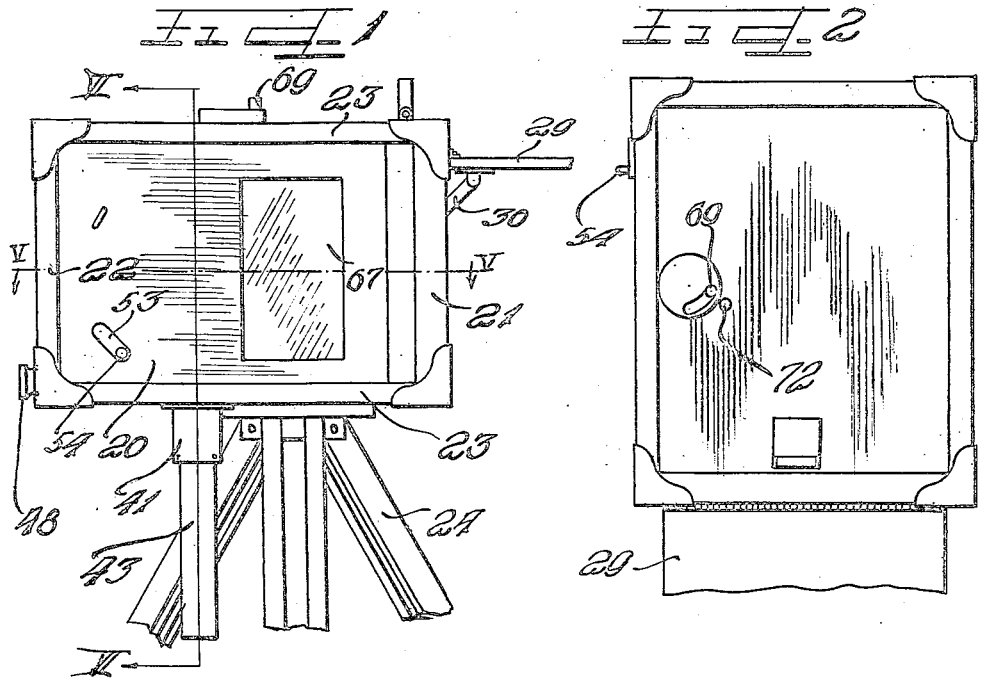
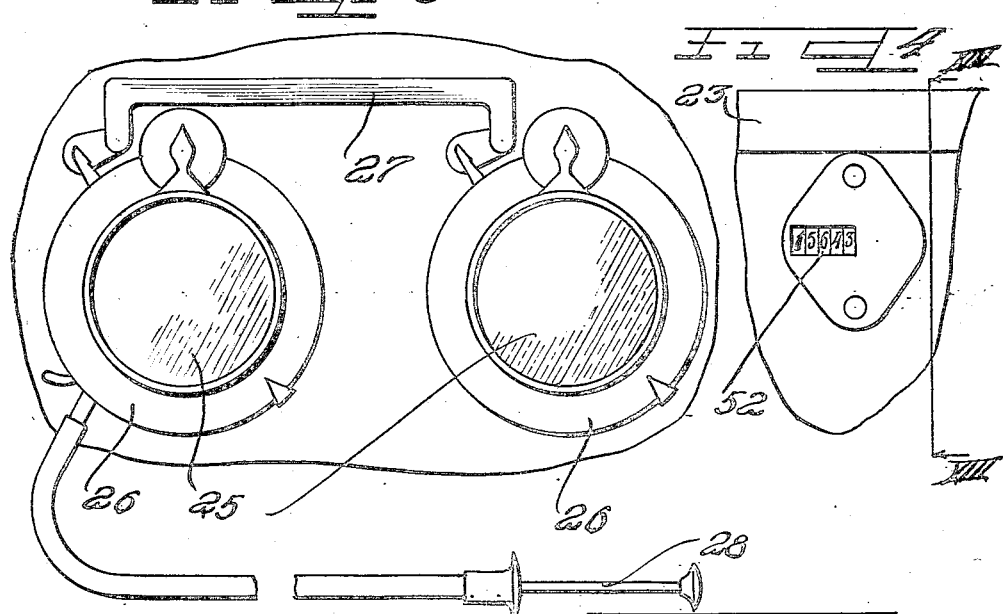
Inventor
William J. Nolan

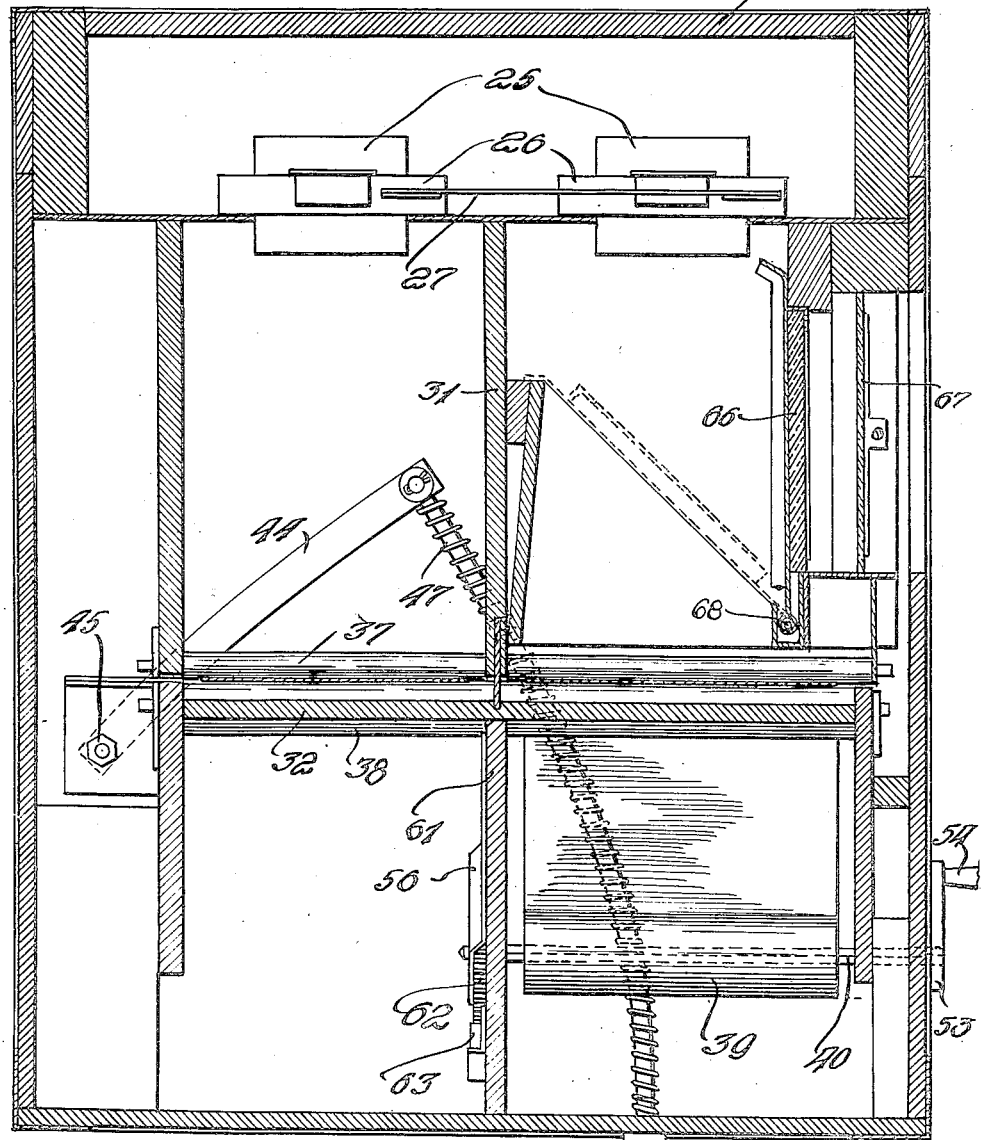

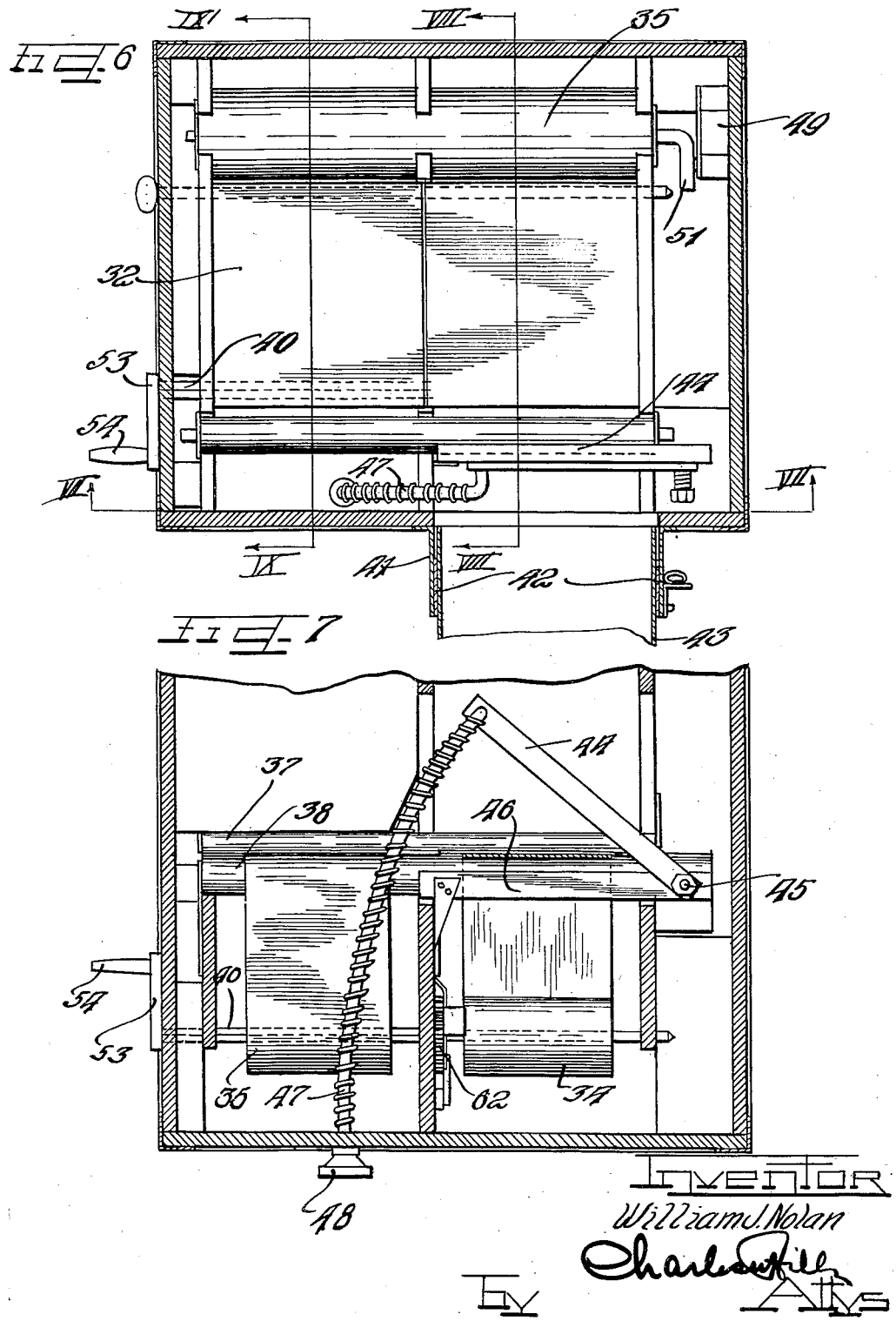

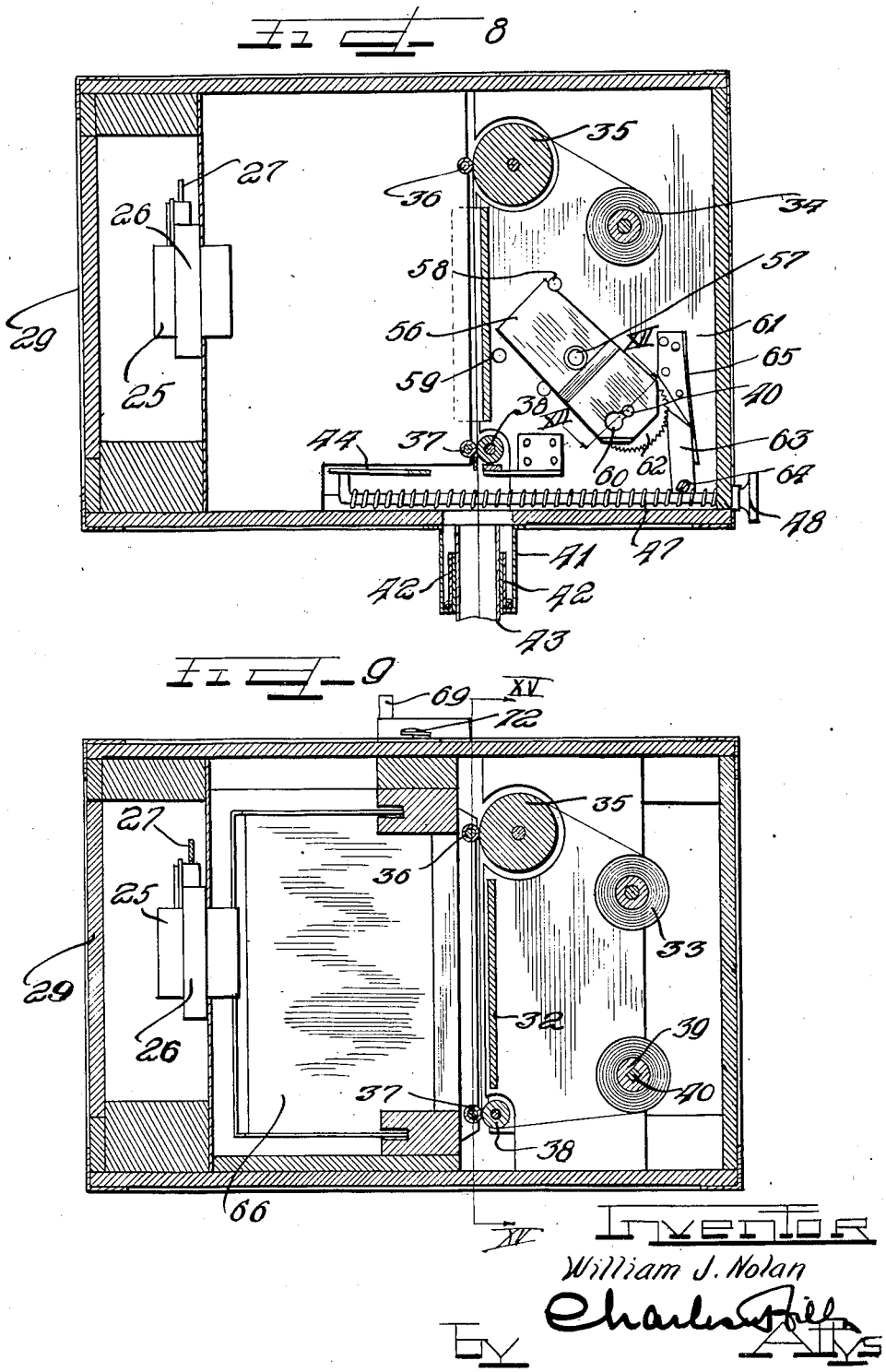

Jan. 14, 1930.                W. J. NOLAN                1,743,616
                                 CAMERA
                            Filed Feb. 7, 1927         6 Sheets-Sheet 5
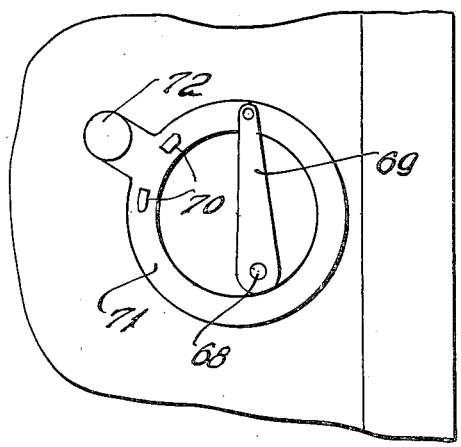
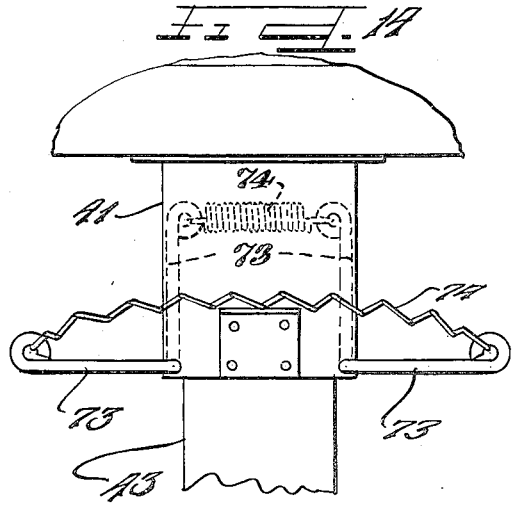
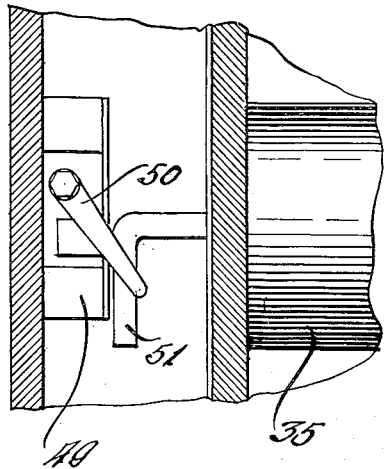
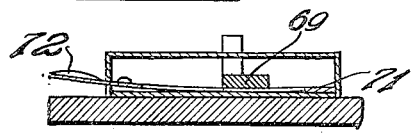
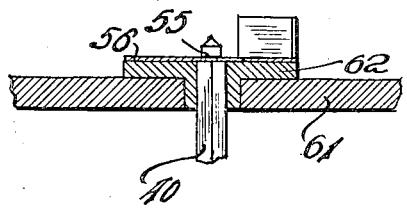
INVENTOR
William J. Nolan
BY Charles Hill ATTYS Jan. 14, 1930.  W. J. NOLAN  1,743,616
CAMERA
Filed Feb. 7, 1927   6 Sheets-Sheet 6
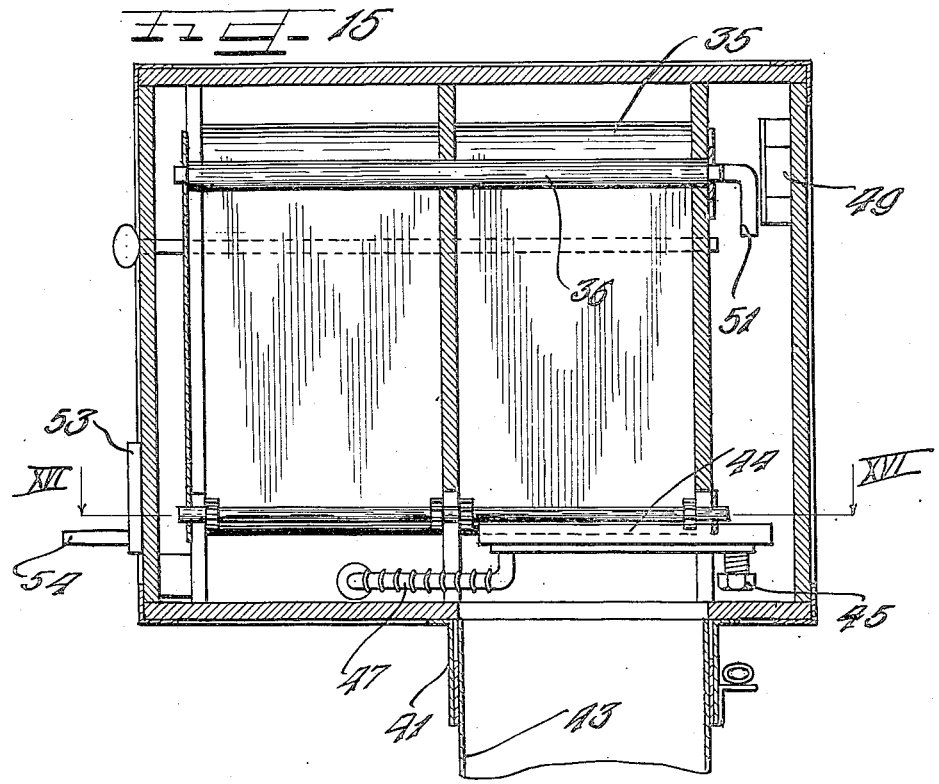
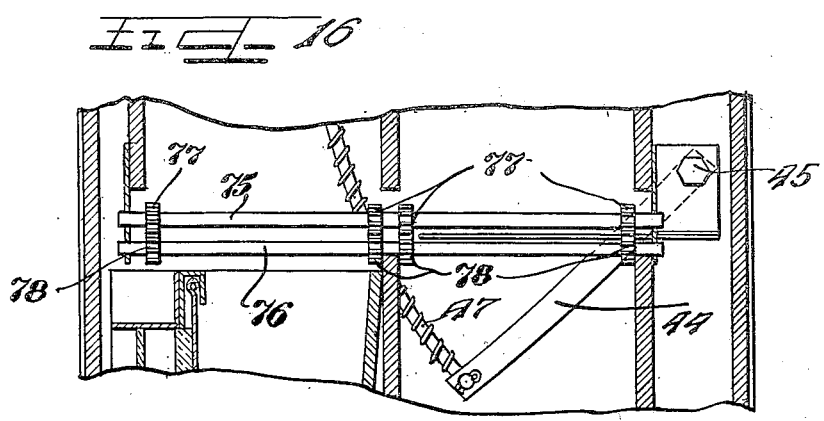
Inventor
William J. Nolan
By Charles Atty Patented Jan. 14, 1930

1,743,616

UNITED STATES PATENT OFFICE

WILLIAM J. NOLAN, OF CHICAGO, ILLINOIS, ASSIGNOR TO MARY A. NOLAN, OF CHICAGO, ILLINOIS

CAMERA

Application filed February 7, 1927. Serial No. 166,359.

Since the advent of the dry plate and film it is not usual to develop the plate or film immediately after exposure. This has several disadvantages.

First where portraits are taken commercially without orders being given previously for the purpose of subsequently obtaining orders from proofs of the completed picture the length of time elapsing between the taking of the photograph and the showing of the proof to the subject allows the interest of the latter to cool and results in loss of orders.

Further having taken a picture whether portrait or landscape the photographer often does not know whether he has made a correct exposure, whether he has secured the particular effect he desires, whether movement of the camera or of part of the scenery has spoilt the picture, and in general whether he has been successful or not.

Immediate development, on the other hand, also has its disadvantages. It is necessarily hurried. The conditions under which it takes place must to a large extent be fixed and standardized and cannot readily be changed to bring out a weak negative or check one which has been over-exposed. Moreover, adequate washing of the film is almost an impossibility.

The object, therefore, of this invention is to provide means for taking two pictures, one for immediate development, and the other for later more careful development in the usual dark room.

The two plates, strips of film, or the like are for convenience designated as the permanent and temporary plates, films, etc.

Preferably, two lenses are employed connected for simultaneous operation as they are in a stereoscopic camera. As the final finished picture is taken with one lens only the latter is directed towards the subject with the result that the other temporary picture is offset some inches.

For landscapes and the like this offsetting is not serious, but for portraits it may impair the appearance of the subject or prevent an adequate idea being obtained of the final picture.

This difficulty may be overcome in various ways, one is to mark on the ground glass or finder used for the permanent film the field covered by the temporary film and then see that the latter includes all of the essentials of the permanent picture. This may involve making the permanent picture include more than is really requisite. Another method is to use a lens for taking the temporary picture which is of somewhat wider angle than the other lens so that the temporary picture includes all that the final picture will show, although on a somewhat smaller scale.

Employing two lenses it is sometimes desirable to use two of different speeds. It is well-known that the greater the aperture at which a lens will " cut " sharply the more expensive it is. In portrait work it is often desired to use a lens at its maximum aperture to throw the background out of focus and for other purposes and for such reasons for the permanent picture and expensive lens of large aperture is desired.

For the temporary lens it is not so important to get this variation in depth of focus so that while the permanent picture may be taken with an F 4.5 aperture and $\frac{1}{10}$ sec., the temporary picture may be taken simultaneously with a much cheaper lens using an F 8 aperture and $\frac{1}{2}$ sec.

Other features of my invention will be hereafter more fully explained in connection with the accompanying drawings in which:

Figure 1 is a side elevation of a camera constructed in accordance with the present invention.

Figure 2 is a top view of the same.

Figure 3 is a partial front elevation showing the lenses and their operating mechanism.

Figure 4 is a detail view of the film recording device.

Figure 5 is a section on the line V—V of Figure 1 with the lens hood closed.

Figure 6 is a section on the line VI—VI of Figure 1.

Figure 7 is a section on the line VII—VII of Figure 6.

Figure 8 is a section on the line VIII—VIII of Figure 6.

Figure 9 is a section on the line IX—IX of Figure 6.

Figure 10 is a plan view of the mirror release with the cover removed.

Figure 11 is a central vertical section through the mirror release.

Figure 12 is a detailed sectional view on the line XII—XII of Figure 8.

Figure 13 is a section on the line XIII—XIII of Figure 4.

Figure 14 is a detail end view of the film discharge orifice.

Figure 15 is a section on the line XV—XV of Figure 9 of a modified form of construction.

Figure 16 is a section on the line XVI—XVI of Figure 15.

As shown on the drawings:

The camera comprises a casing 20 composed of two parts, a front part 21 and a rear part 22. The top and bottom of the casing are secured to the front part 21 while the two sides are attached to the rear part 22. Flanges 23 on the top and bottom act as mechanical retaining means for the sides as well as light excluding means.

The bottom of the casing is provided with the usual threaded socket for the reception of the screw of the tripod 24.

The film rollers and film moving and developing mechanism are carried by the rear part of the casing, while the lenses and focusing devices are carried by the front portion.

As shown, a pair of lenses 25 are used having shutters 26 operatively connected by a link 27 so that they may be operated simultaneously either by hand or preferably by a cable release 28. This connection for simultaneous release does not interfere with setting the shutters for different speeds and different apertures so that lenses of different calibre may be employed simultaneously. The construction of these lenses (except that one is preferably of wider angle than the other) and their focusing as well as the construction and operation of the shutters is no part of the present invention and hence is not described in further detail.

The lenses and their shutters are set back from the front plane of the casing to allow a hinged hood 29 to completely close the end of the casing. When it is desired to take a photograph the hood is elevated and held in place by a toggle jointed arm 30.

The interior of the casing is divided into two compartments by a central partition 31 attached to the top and bottom of the casing and abutting along its rear edge with transverse partition 32. The two strips of film are drawn over this transverse partition so as to present a flat surface for the reception of the photographic image.

Focusing is preferably accomplished on the reflex principle although a focusing scale with distances marked thereon may be used in addition or alternatively. As shown a pivotally mounted mirror 66 is provided adapted to throw the image for the permanent film onto a ground glass 67 arranged in one side of the casing. The spindle 68 of the mirror 66 extends through the top of the casing and carries an arm 69 by which the mirror may be moved from the position shown in full lines in Figure 5 to the dotted line position against the action of a spring not shown. In the latter position the arm 69 lies between two lugs 70, 70 on a spring ring 71 and is thereby held until the ring is depressed by pressure on its projection 72. As soon as the arm 69 is released the spring of the mirror immediately throws the latter to the side in readiness for an exposure.

On the ground glass 67 may be marked the field covered by the temporary film and its lens at any given distance, say 8 feet.

The rolls of unexposed film 33 (permanent) and 34 (temporary) are rotatably mounted on a rod which extends through the sides of the casing and through the central aperture in the rolls of film.

The strip of film from each roll then passes over a large roll 35 the circumference of which is conveniently the distance between succeeding exposures on the strips of films so that the film must be advanced one complete revolution of the roll 35 for each exposure. To ensure that the roll 35 turns as the film is drawn over its surface the strips of film are pressed against it by a roller 36 mounted on the front portion of the casing.

Passing between these rolls 35 and 36 the two strips of film passed downwardly over the partition 32 to a second pair of rolls 37 and 38. The permanent film passes around roll 38 to a winding-up roll 39 on a squared spindle 40. The temporary film passes vertically downwards towards a discharge chute 41 as shown in Figure 8.

This discharge chute 41 is provided along its longer inner margins with hinged flaps 42 which normally close the bottom of the chute and so exclude the entry of light into the interior of the casing. These hinged flaps do not, however, interfere with the insertion of the upper end of a developing tank 43 into this film discharge chute, in fact they aid in retaining the tank in said chute by the frictional force exerted thereby on the sides of the tank. These hinged flaps 42 are provided at one end with arms 73 connected together by a spring 74, as shown in Figure 14, which normally holds the flaps in closed position.

When the exposed portions of both the films have been moved past the rolls 37 and 38 the next step is to sever the exposed portion of the temporary film from the unexposed portion so as to allow the first portion to drop down into the developer. For this purpose a knife blade 44 is provided pivoted at 45 to a steel strip 46 with which it cooperates to cut the strip of film extending therebetween as in the well-known print trimmers. Conveniently this knife blade is operated by a curved rod 47 passing through the rear wall of the casing and terminating in a knob 48. A spring surrounding this rod 47 serves to hold the knife 44 in the extended position shown in Figure 7 until it is desired to sever the films by pulling the knob 48 outwardly.

In ordinary kodaks it is usual to employ films in rolls with numbers marked on a black strip wound with the sensitive film to indicate how far the film should be moved between each exposure. This number was visible through a red window in the back of the camera. This method necessitates the use of rolls of films specially marked and also a camera case in which the film passes adjacent the back wall. In the form of construction shown the reels for unexposed and exposed film are between the back of the casing and that portion of the film presented for exposure, hence other indicating means are required.

In my preferred form of construction, as already mentioned, the circumference of the roll 35 is equal to the distance between succeeding exposures on the strips of film. Hence all that is required is to provide means for indicating when each revolution of the roll has been completed and also how many revolutions the roll has made so that the operator may know how many exposures he has made with any given roll of film.

Various devices may be used for this purpose. The particular means shown is similar to the cyclometer or mileage indicator 49 used on cycles or automobiles. The device 49 has an arm 50 adapted to be engaged by a crank 51 (see Figure 13) on the end of the spindle which carries the roll 35. The arm 50 is normally spring held in the position shown in Figure 13 so that as the crank 51 moves it upwardly the spring is compressed and as soon as the arm is free to slip past the crank it returns to its normal position. The counting mechanism 52 (Figure 4) is moved forward one unit each time the arm 50 is moved upwardly by the crank 51. Either the movement of the counting mechanism or the " click " made by the return of the arm 50 to its initial position may be used to indicate the end of each revolution of the roll 35.

The reel 39 on which the exposed permanent film is wound is slidably mounted on a squared rod 40 provided at its outer end with a crank 53 and handle 54 by which it may be turned.

Accidental withdrawal of the rod 40 is prevented by forming an annular groove 55 (Figure 12) on the inner end of the rod for releasable engagement with a plate 56. This plate 56 is pivotally mounted at 57 (Figure 8) on a vertical partition 61, so that it may turn within a restricted arc between stops 58 and 59. In this plate is an aperture 60 of keyhole shape so that when the plate is in one position the large end of the aperture is presented to the rod 40 so that the latter may be inserted or withdrawn. In the other position the restricted edges of the aperture 60 enter the annular groove 55 and lock the rod 40 against longitudinal movement.

To prevent retrograde rotation of the rod 40 a ratchet wheel 62 is journaled in the partition 61 and provided with a central squared aperture for the passage of the rod 40. This ratchet wheel is held in place by the plate 56 as shown in Figure 8. A pawl 63 pivoted at 64 is pressed against the ratchet wheel 62 by a spring 65.

In operation the drawing of the permanent film between the pairs of rolls 35—36 and 37—38 causes the latter to turn and the rotation of the rolls imparts movement to the temporary film so that the winding of the exposed part of the permanent film causes a corresponding movement of the temporary film towards the discharge chute and developing tank.

In the form of construction shown in Figures 15 and 16 rolls 35 and 36 are retained but in place of rolls 37 and 38 a pair of shafts 75 and 76 carrying pinions 77 and 78 respectively in mesh with each other. These pairs of pinions are spaced apart slightly so as to allow the edges of the film to pass between so that a more positive drive for the temporary film is thereby obtained than is the case when frictional rolls only are provided.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A camera comprising means for exposing two sheets of light sensitive material simultaneously, and means wherein one of said sheets may be developed substantially immediately after exposure to obtain a picture similar to that which will be obtained from the other sheet when developed later.

2. A camera comprising two lenses, means for supporting two rolls of light sensitive material, means for exposing a portion of each of said rolls simultaneously, means for winding up the exposed portion of one roll, a developing tank and means for discharging the exposed portion of the other roll into said developing tank.

3. A camera comprising a casing, two pairs of rolls within the casing at one end thereof, one pair being arranged vertically over the other, means for feeding two strips of light sensitive material downwardly and side by side between said pairs of rolls. a pair of lenses mounted on the other end of said casing each adapted to throw photographic images upon the portions of one of said strips lying between said pairs of rolls, a roller adapted to wind up the exposed portion of one strip, a chamber adapted to receive the simultaneously exposed portion of the other strip, and means for severing said last mentioned exposed portion.

4. A camera comprising a casing having an opening in the bottom thereof, a lens at one end of said casing, a support for a sensitive sheet adjacent the other end, a spring held flap adapted normally to close said opening, and a tank adapted to enter said opening against the resistance of said flap to receive a portion of said sensitive sheet for development.

In testimony whereof I have hereunto subscribed my name at Chicago, Cook County, Illinois.

WILLIAM J. NOLAN.